US008890422B2

(12) United States Patent
Pollock et al.

(10) Patent No.: US 8,890,422 B2
(45) Date of Patent: Nov. 18, 2014

(54) LED POWER SUPPLY

(75) Inventors: Charles Pollock, Station Approach Oakham (GB); Helen Pollock, Station Approach Oakham (GB)

(73) Assignee: Technelec Ltd (GB)

( * ) Notice: Subject to any disclaimer, the term of this patent is extended or adjusted under 35 U.S.C. 154(b) by 211 days.

(21) Appl. No.: 13/510,994

(22) PCT Filed: Nov. 22, 2010

(86) PCT No.: PCT/GB2010/002139
§ 371 (c)(1),
(2), (4) Date: Oct. 5, 2012

(87) PCT Pub. No.: WO2011/061505
PCT Pub. Date: May 26, 2011

(65) Prior Publication Data
US 2013/0020951 A1    Jan. 24, 2013

(30) Foreign Application Priority Data

Nov. 20, 2009   (GB) .................................. 0920359.7

(51) Int. Cl.
G05F 1/00         (2006.01)
H05B 37/02        (2006.01)
H02M 3/156        (2006.01)
H05B 33/08        (2006.01)

(52) U.S. Cl.
CPC ................................. H05B 33/0809 (2013.01)
USPC ............................ 315/186; 323/282; 327/536

(58) Field of Classification Search
CPC ................................ H02M 3/335; H05B 37/02
USPC .................. 315/291, 186; 323/282, 284, 351; 363/24, 17, 21.02
See application file for complete search history.

(56) References Cited

U.S. PATENT DOCUMENTS 4,988,889 A      1/1991  Oughton, Jr.
6,094,038 A *    7/2000  Lethellier ..................... 323/282

(Continued)

FOREIGN PATENT DOCUMENTS

AU   2009200556 A1   9/2009
GB      2449616 A    11/2008

(Continued)

OTHER PUBLICATIONS

International Search Report; International Application No. PCT/GB2010/002139; International Application Filing Date Nov. 20, 2010; Mail date Apr. 11, 2011.

(Continued)

*Primary Examiner* — Douglas W Owens
*Assistant Examiner* — Wei Chan
(74) *Attorney, Agent, or Firm* — Cantor Colburn LLP

(57) ABSTRACT

A power supply circuit having at least two conversion stages wherein the first conversion stage includes input terminals for connection to an ac or dc supply, an electronic converter with constant output current characteristics and output terminals for connection to at least one second conversion stages. Each second conversion stage includes input terminals to receive a substantially constant current input from a first conversion stage, current multiplier circuit and output terminals for connection to a load. The electric converter of the first conversion stage is a high frequency resonance converter having a series parallel resonant converter with an inductance connected in series with a capacitor. The output terminals for connection to the second conversion stage are connected across the capacitor and the inductance. Circuits are particularly suitable for lighting applications, for controlling the large number of LEDs in LED display panels or in backlighting for televisions and LCD displays.

17 Claims, 11 Drawing Sheets

(56) References Cited

U.S. PATENT DOCUMENTS

| | | | |
|---|---|---|---|
| 6,392,902 B1* | 5/2002 | Jang et al. | 363/17 |
| 6,483,724 B1* | 11/2002 | Blair et al. | 363/17 |
| 7,265,527 B1* | 9/2007 | Haug | 323/282 |
| 7,283,379 B2* | 10/2007 | Baker et al. | 363/98 |
| 8,345,450 B2* | 1/2013 | Yan et al. | 363/16 |
| 8,385,504 B2* | 2/2013 | Hattrup et al. | 378/101 |
| 8,587,267 B2* | 11/2013 | Suntio et al. | 323/262 |
| 8,599,578 B2* | 12/2013 | Worek et al. | 363/21.02 |
| 8,605,463 B2* | 12/2013 | Nakanishi | 363/21.02 |
| 2002/0176264 A1* | 11/2002 | Raets et al. | 363/24 |
| 2004/0183380 A1* | 9/2004 | Otake | 307/82 |
| 2006/0018132 A1 | 1/2006 | Price et al. | |
| 2006/0076904 A1* | 4/2006 | Wiedemuth et al. | 315/291 |
| 2006/0152947 A1* | 7/2006 | Baker et al. | 363/16 |
| 2011/0038181 A1* | 2/2011 | Yan et al. | 363/17 |
| 2013/0294118 A1* | 11/2013 | So et al. | 363/21.16 |

FOREIGN PATENT DOCUMENTS

| | | |
|---|---|---|
| WO | 9849874 A1 | 11/1998 |
| WO | 2007102106 A2 | 9/2007 |

OTHER PUBLICATIONS

Written Opinion; International Application No. PCT/GB2010/002139; International Application Filing Date Nov. 20, 2010; Mail date Apr. 11, 2011.

British Search Report; GB Application No. GB0920359.7; GB Application Filing Date Nov. 20, 2009; Search Date Mar. 19, 2010.

European Search Report issued Jan. 21, 2014 re: 10 800 974.7-1802; pp. 4; citing: AU 2009 200 556 A1, US 7 265 527 B1, US 4 988 889 A and WO 2007/102106 A2.

* cited by examiner

LED POWER SUPPLY

The present invention relates to a power supply and is concerned more particularly, though not exclusively, with power supplies suitable for driving solid state lighting such as LEDs.

Solid state lighting is now being adopted as the preferred high efficiency lighting solution. It is essential that the efficiency of the power supply to drive the LEDs is optimised. A typical LED with high luminous output, of the type used in lighting circuits has a forward voltage between 2V and 4V. It is usual to connect LEDs in series to create enough luminous intensity to replace more conventional light sources with three, four or five LEDs (depending on colour) making a string in the region of 12V. The challenge for the power supply is to convert a higher voltage ac or dc supply down to 12V as efficiently as possible. Furthermore it is essential that the current through the LED is controlled. The forward voltage across the LED string depends on temperature and also depends on component tolerances. The luminous intensity must be held relatively constant despite changes in temperature or component tolerances.

FIG. 1 shows a dc to dc converter commonly used to drive LEDs. This dc to dc converter is known as a buck converter or step down converter because it takes a dc input voltage and converts it to a lower dc output voltage. A capacitor 1 is connected across the input terminals. The switching transistor 2 operates by alternatively switching on and off with a duty ratio and period causing the current in inductor 4 to rise and fall about a mean level. Diode 3 provides a path for the inductor current when the switching transistor is off. An LED string 20 with one or more LEDs is connected across the output terminals. In order to control the current in the LED string it is usual to measure the current. This can be done with a low value resistance 5 in series with the LEDs and current feedback circuit 6 to vary the duty ratio of the switching transistor 2.

This circuit is commonly used in the prior art but suffers from the following disadvantages:
  (i) The measurement of the current with a series resistor introduces an additional loss.
  (ii) Operation with significant voltage step down ratios occurs at very low duty ratio with high peak current and poor utilisation of the circuit components.
  (iii) Operation with significant voltage step down ratios lowers the circuit efficiency considerably.

In addition to the buck converter, other dc to dc converters are commonly used in the prior art. Another common circuit is the fly-back circuit (isolated buck-boost) circuit. The flyback circuit has the advantage that the output can be isolated from the input and the turns ratio of the transformer can assist in the step down ratio of the circuit. However, the operation of the fly-back circuit impresses a voltage requirement on the switching transistor which is twice the supply voltage. This increases the cost of the components. Furthermore the use of components with higher voltage rating incurs higher losses.

A current controlled buck converter cannot easily be used with an ac supply dimming circuit without significant modification. As the supply voltage is reduced by the triac of the ac supply dimmer, the constant current controller will act to maintain constant current in the LED as the input voltage drops. The controller therefore has to be modified to control the LED current to be a function of the input voltage. This adds additional cost and complexity to the power supply.

The constant current characteristics of LCL series parallel resonant circuits was reported in "Simple constant frequency constant current load resonant power supply under variable load conditions", *IEE Electronics Letters,* 28 Aug. 1997, Vol. 33, No. 18. and in "A constant frequency, constant current, load-resonant capacitor charging power supply", *IEE Proc. Electric Power Applications,* Vol. 146, Issue 2, pp. 187-192, March 1999. An LCL resonant circuit as published in the prior art is shown in FIG. 2. Two capacitors 11 and 12 are connected across a dc supply, provided from input terminals 10. One end of the series parallel resonant network is connected to the mid-point of the two capacitors 11 and 12. The other end of the resonant network is connected to the mid-point of two switching transistors 13 and 14. The resonant network consists of an inductance 15 in series with a capacitance 16. A further inductance 17 connected in series with the load 18 creates a parallel path around the capacitor 16. If the circuit is driven at a frequency where the reactances of the inductor 15 and capacitor 16 are equal, then the current flowing through inductance 17 and the load 18 is constant and is independent of the load resistance. Furthermore, if the inductance of 15 and 17 are similar then the circuit has a resonant frequency which is independent of the load resistance.

In GB2449616 a LCL series parallel resonant circuit has been proposed to directly drive LEDs, as illustrated by FIG. 3. GB2449616 replaces the load 18 of FIG. 2 with a rectifier 19 to convert the high frequency ac to dc to drive the LED string 20. The LCL resonant circuit has a pre-determined constant current characteristic when at resonance and avoids the need for current feedback. However, it has been found that the efficiency of the LCL resonant circuit drops when it is used to drive lower voltage LED strings. One reason for this drop in efficiency is that the voltage dropped across the rectifier 19 is significant relative to the forward voltage of a lower voltage LED string. For example, even with the use of Schottky diodes the forward voltage drop in the rectifier 19 could be 5% of forward voltage of a 12V LED string. This is a 5% loss in efficiency. This problem can be addressed with synchronous rectification but at an increased cost and complexity. Therefore the LCL resonant circuit according to GB2449616 does not offer a high efficiency method to drive lower voltage LED strings from a mains ac supply voltage. Unlike LED drivers based on buck converters, this circuit is suitable for use with triac dimming circuits as the "constant" LED current is directly proportional to the input supply voltage. However, any attempt to vary the LED current independently of the input supply results in non-ideal switching characteristics in the resonant circuit and a loss in efficiency.

None of the prior art circuits offer a cost competitive and efficient method to drive a lower voltage LED string from a higher voltage ac or dc supply. Furthermore, the prior art circuits do not offer the capability of varying the LED current in response to variations in the input supply while also allowing the LED current to be varied at a constant supply voltage without requiring complex current and voltage feedback circuits. Current feedback circuits add cost to the power supply and reduce its efficiency.

In other applications such as automotive lighting circuits operation of multiple LED strings requires repetition of all circuit components and individual current feedback for every individual string resulting in a higher cost circuit. Furthermore, when red, green and blue coloured LEDs are used in colour blending applications separate power supply circuits need to be used for each colour, each with its own current feedback and controller, to maintain pre-set currents through each colour of LED.

It is the object of this invention to provide a power supply circuit which overcomes the limitations of the prior art and offers a high efficiency and cost competitive solution to driving one or more low voltage LED strings from a higher voltage ac or dc supply.

The power supply according to this invention provides a dimming capability either by direct variation of the input supply or independently of the input supply by a simple internal controller.

It is a further object of this invention to provide a cost effective power supply to drive one or more LED strings from a single power supply without the need to individually monitor the current in each string.

It is a further object of this invention to provide a very low cost method to drive three colour LEDs and independently vary the current through each colour of LED to create a low cost colour blending power supply.

In a further aspect of this invention a power supply is disclosed which does not require current feedback in order to obtain acceptable current regulation, even under significant changes in the LED voltage or number of LEDs in a string.

According to this invention there is provided a power supply comprising at least two conversion stages, a first conversion stage comprising
  (i) input terminals for connection to an ac or dc supply,
  (ii) an electronic converter with controlled or pre-determined output current characteristics and
  (iii) output terminals for connection to at least one second conversion stages,
each second conversion stage comprising
  (i) input terminals to receive a substantially constant current input from a first conversion stage,
  (ii) current multiplier circuit and
  (iii) final output terminals for connection to a load.

According to a further aspect of the invention the load connected to each of the second conversion stages comprises one or more LEDs connected in series.

According to a further aspect of the invention the current flowing out of the output terminals of the first conversion stage is substantially constant irrespective of variations in the number and forward voltage characteristics of the LEDs connected to the output terminals of each of the second conversion stages.

According to a further aspect of this invention the first conversion stage is a high frequency inverter driving a resonant circuit.

According to a further aspect of the invention the first conversion stage is directly connected to one second conversion stage.

According to a further aspect of the invention the first conversion stage is connected to two or more second conversion stages.

According to a further aspect of the invention two or more second conversion stages are connected in parallel.

According to a further aspect of the invention two or more second conversion stages are connected in series.

In order that the invention may be more fully understood reference will now be made, by way of example, to the accompanying drawings, in which.

Figure 1:
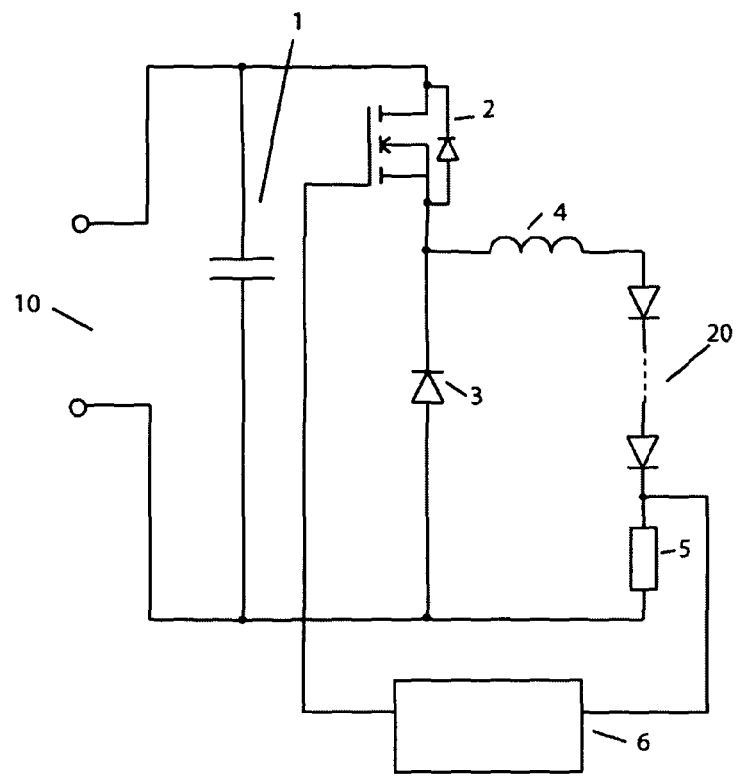
FIG. 1 shows a buck converter according to the prior art.
Figure 2:
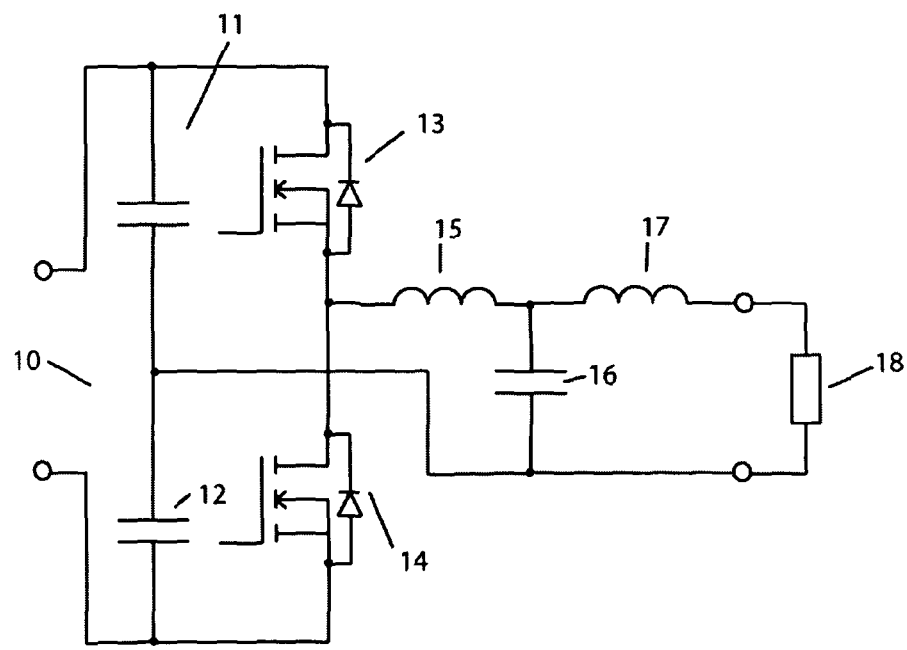
FIG. 2 shows a series parallel resonant converter with constant current characteristics according to the prior art.
Figure 3:
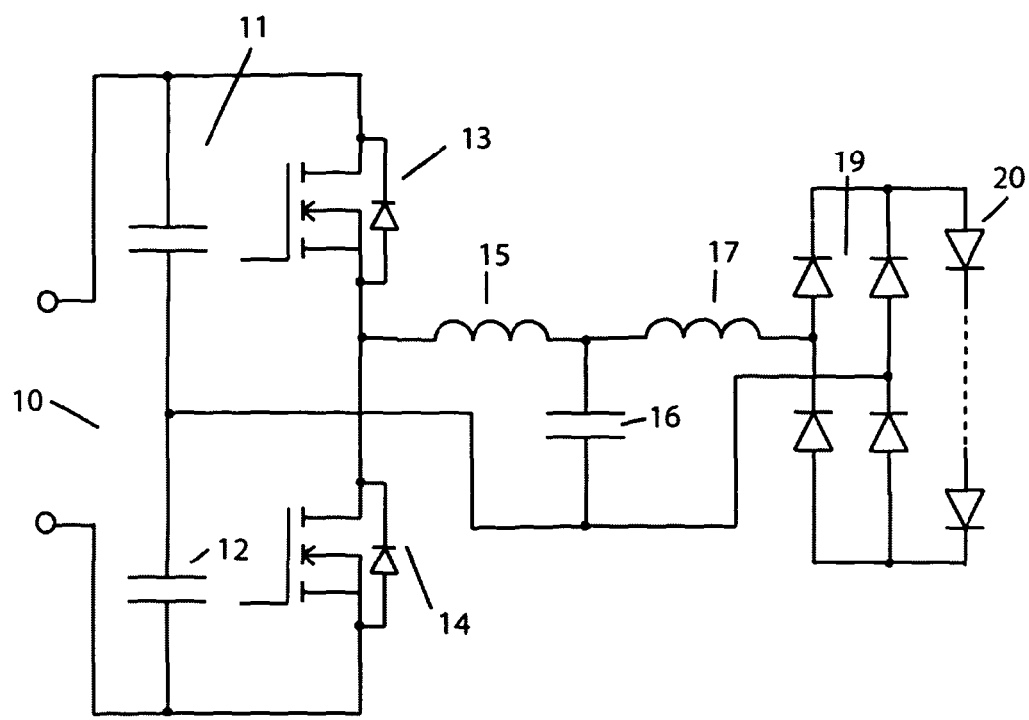
FIG. 3 shows a series parallel resonant converter with constant current characteristics driving LEDs according to the prior art.
Figure 4:
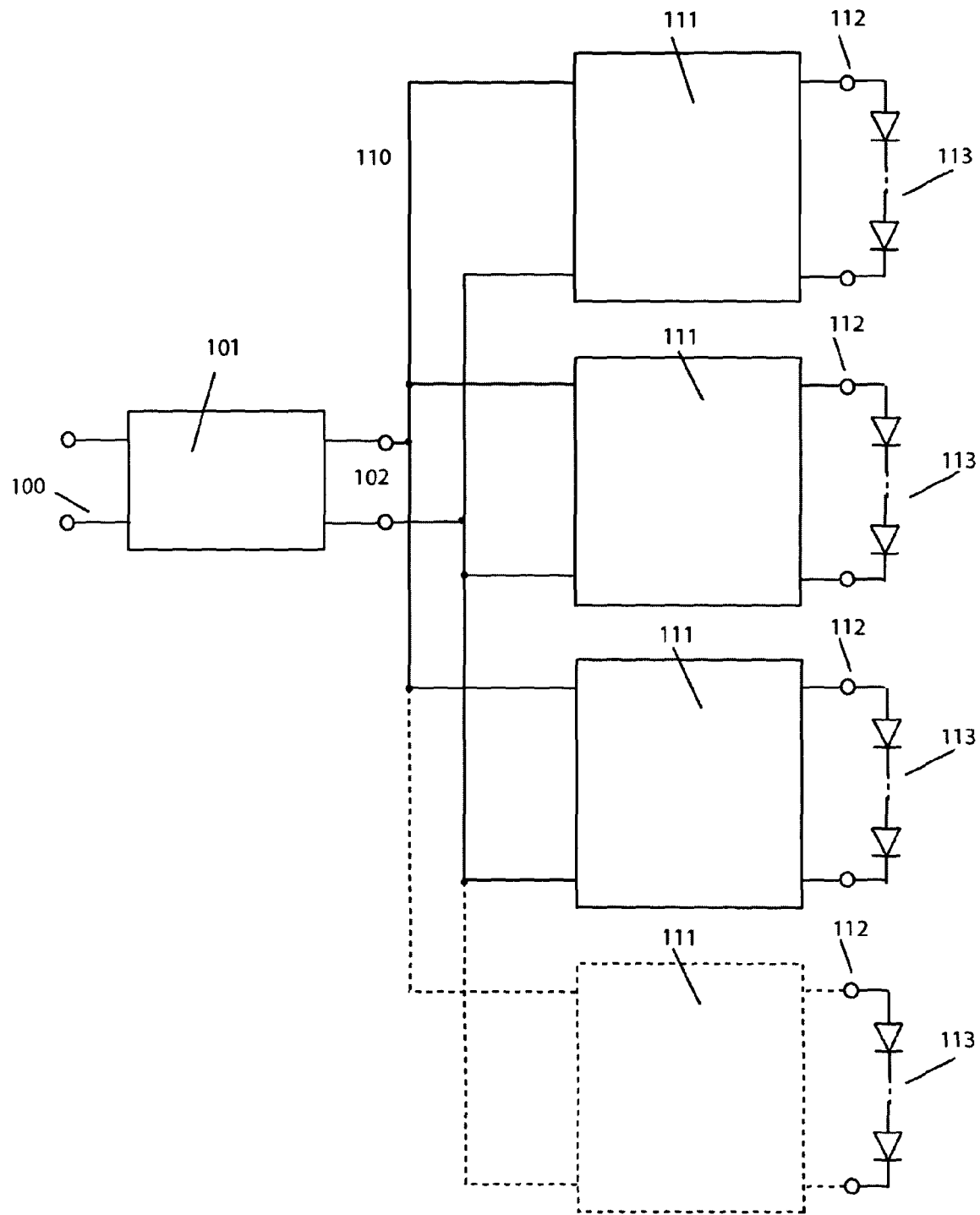
FIG. 4 shows a block diagram of a power supply according to the invention.

FIG. 4 shows a block diagram of a power supply according to the invention. A first conversion stage 101 has input terminals 100 for connection to an ac or dc supply and acts as a controllable or pre-determined current source to the output terminals 102 of the first conversion stage. The first conversion stage may be based on a series parallel resonant circuit, adapted for operation in this invention or may be any other prior art power electronic power supply adapted to provide a controllable or pre-determined current. The first conversion stage has input terminals 100 for connection to an ac or dc supply. When connected to an ac supply an additional rectifier circuit would be used to convert the supply alternating voltage to direct voltage suitable for connection to terminals 100. Additionally the ac supply may have a phase control circuit (dimming circuit) using thyristors or triacs. The first conversion stage has output terminals 102 for connection to one or more second conversion stages. Each second conversion stage 111 has input terminals 110 and output terminals 112. LED strings 113 may be connected to the output terminals of the one or more second conversion stages. Correct operation of the power supply according to the invention does not require that the LED strings connected to each of the second conversion stages be identical. In fact the power supply will correctly regulate the current in each string even if the LED strings have different numbers of LEDs or have different forward voltage characteristics due to being different colour LEDs.

Figure 5:
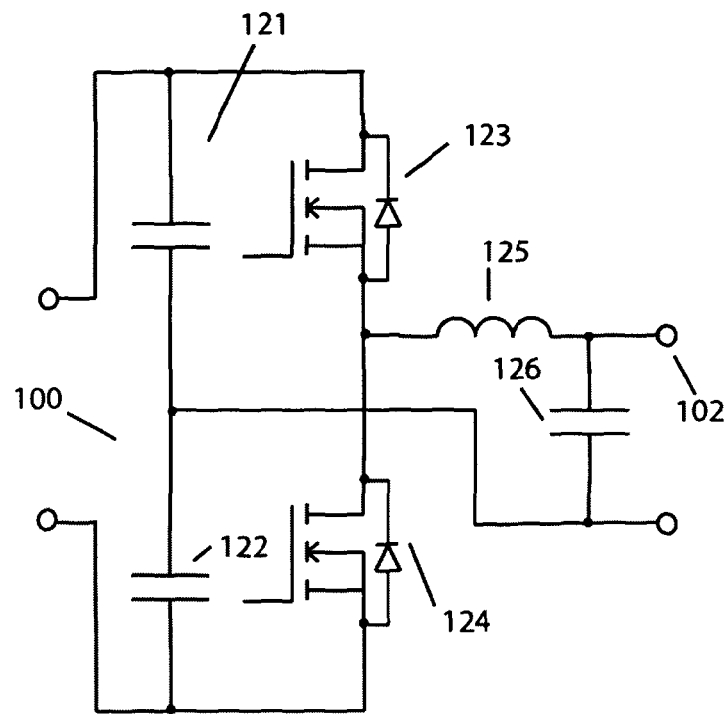
FIG. 5 shows an example of a first conversion stage according to the invention.

An example of the circuit which could be used for the first conversion stage is shown in FIG. 5. The input terminals 100 supply dc voltage to two capacitors 121 and 122. If the first conversion stage is to operate from an ac supply a rectifier circuit would be connected between the ac supply and the input terminals 100 of the first conversion stage. Two switching transistors 123 and 124 are also connected across the dc supply. The resonant network is connected between the midpoint of the switching transistors 123 and 124 and the midpoint of the capacitors 121 and 122. The resonant network comprises an inductor 125 and capacitor 126 to create a series resonant circuit. The output terminals 102 of the first conversion stage are connected across the capacitor 126. One or more second conversion stages therefore form one or more parallel paths around the capacitor to create a form of series parallel resonant circuit. The switching transistors 123 and 124 are operated in a complimentary manner to apply a square wave excitation voltage across the resonant network. The resonant network is driven close to a resonant frequency when the positive reactance of inductor 125 is almost cancelled by negative reactance of capacitor 126. Under these conditions and coupled with the design and operation of the second conversion stage or stages, the current supplied through the output terminals of the first conversion stage will automatically be controlled without requiring any current feedback from the second conversion stage or stages. The output current of the first conversion stage is a high frequency alternating current at the frequency of operation of the resonant circuit. By driving the resonant network close to a resonant frequency the current in the switching transistors naturally returns to zero near to the time when the transistors change state and therefore the switching losses are minimised and the efficiency of the circuit is kept high.

Figure 6:
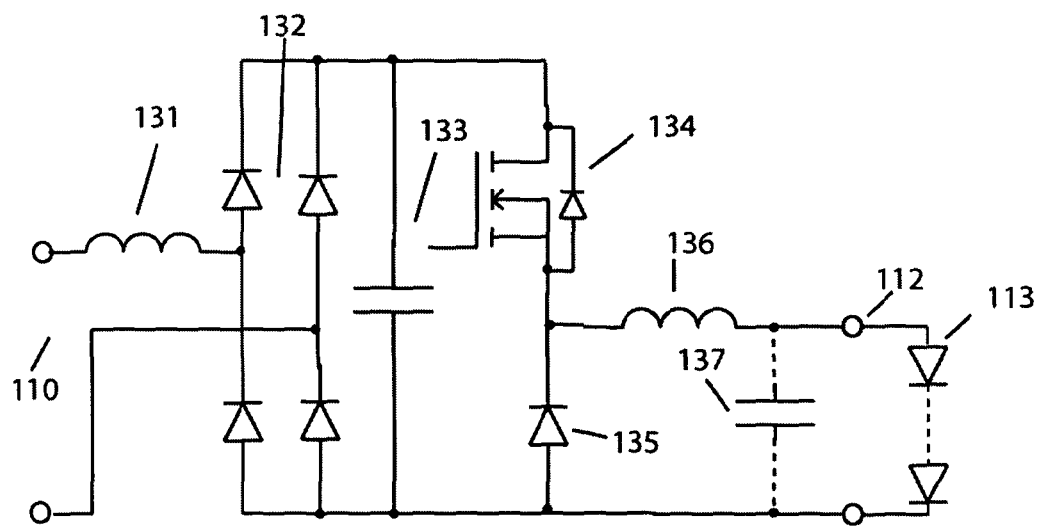
FIG. 6 shows an example of a second conversion stage according to the invention.

FIG. 6 shows an example of a single second conversion stage. The input terminals of the second conversion stage receive a high frequency current from the first conversion stage which passes through inductor 131 to a rectifier 132 to provide a dc voltage on capacitor 133. Switching transistor 134, diode 135 and inductor 136 are arranged as in a buck converter or step down converter. However, the operation of the circuit is quite different from the normal operation of a buck converter. In each second conversion stage the buck converter is used as a current multiplier, taking the controllable or pre-determined current from the output terminals of the first conversion stage as a fixed input current, multiplying the fixed input current by a multiplier factor to deliver a controlled output current to a load connected to the output terminals 112 of the second conversion stage. The multiplier factor of each second conversion stage is directly controlled by the switching transistor 134 and is substantially independent of the load connected to the output terminals 112. Therefore, since the input current to the second conversion stage has been predetermined by the design of the first conversion stage and is substantially independent of the operation of the second conversion stage and since the multiplier factor can be controlled directly by the second conversion stage, the current delivered to a load connected to the output terminals 112 of the second conversion stage can be held constant without requiring any current feedback.

The control of a second conversion stage will now be analysed in more detail to illustrate the control of the current multiplier factor. There are two situations which can occur and need to be analysed separately. The first is when the current in inductor 136 is always greater than zero. This is referred to as continuous inductor current mode of operation. The second mode is discontinuous inductor current when the inductor current returns to zero within each period of operation of the second conversion stage.

In continuous inductor current mode, when the switch 134 is conducting, the current in the inductor 136 increases from $I_{min}$ to $I_{max}$ according to $$I_{max} - I_{min} = \frac{(V_{in} - V_{out})D \cdot T_s}{L} \quad (1)$$

where $T_s$ is the period of operation of the switching transistor 134,

D is the duty ratio of the switching transistor (ratio of on-time to period, $T_s$), $V_{in}$ is the voltage on capacitor 133, $V_{out}$ is the voltage at the output terminals 112 and L is the value of inductance 136.

When the switch 134 is turned off the current in the inductor 136 flows through diode 135 into the load and decreases from $I_{max}$ to $I_{min}$ according to $$I_{max} - I_{min} = \frac{V_{out}(1 - D)T_s}{L} \quad (2)$$

Since D is the fraction of time during which the switching transistor is conducting, the average switch current, $I_{sw\_average}$ is given by:

$$I_{sw\_average} = \left(\frac{I_{max} + I_{min}}{2}\right)D \quad (3)$$

The voltage, $V_{in}$, on the capacitor 133 will take up a value such that the average switch current given by equation (3) is equal to the average current supplied to the input terminals by the first conversion stage. In a power supply according to this invention the current supplied to the input terminals of the second conversion stage is a predefined value Iin, so the voltage on the capacitor 133 will take up a value $V_{in}$ such that:

$$I_{in} = I_{sw\_average} = \left(\frac{I_{max} + I_{min}}{2}\right)D \quad (4)$$

In the continuous inductor current mode the average output current from the buck converter to the load is given by $$I_{out} = \left(\frac{I_{max} + I_{min}}{2}\right) \quad (5)$$

which, by substitution from (4) gives an equation relating the average output current of the second conversion stage to its average input current;

$$I_{out} = \frac{I_{in}}{D} \quad (6)$$

The output current of a second conversion stage in continuous current mode is given by the average input current divided by the duty ratio of the switching transistor 134. The current delivered to the load is completely independent of the value of the load voltage or the equivalent series resistance of the load. Therefore if the input terminals of a second conversion stage are connected to the output terminals of a first conversion stage with constant current characteristics the output current of the second conversion stage will also be constant and related to the input current of the second conversion stage by a multiplier, M, given by:

$$M = \frac{1}{D} \quad (7)$$

Since the duty ratio is less than one, the multiplier, M, is greater than one.

Using this second conversion stage in conjunction with a constant current first conversion stage will deliver constant current to a load comprising a string of LEDs without requirement to monitor the current through the LEDs. Furthermore if the forward voltage of the LED string varies, due to temperature or component variations, the current through the LEDs will not alter.

In discontinuous inductor current mode, the current in output inductor 136 drops to zero before the switch 134 turns back on again in the next period. Therefore the minimum inductor current, $I_{min}$ is zero. The voltage on capacitor 133 will again find a value $V_{in}$, such that the average current in the switching transistor 134 is balanced by the predetermined constant input current, $I_{in}$, and is given by:

$$I_{in} = I_{sw\_average} = \left(\frac{I_{max}}{2}\right)D \quad (8)$$

In discontinuous inductor current mode, equation (2) changes to:

$$I_{max} = \frac{V_{out}(D_2 - D)T_s}{L} \quad (9)$$

where $D_2$ is the fraction of the period during which current is non zero Combining (8) and (9) and rearranging to find $D_2$ gives:

$$D_2 = D\left(1 + \frac{2I_{in}L}{D^2 V_{out} T_s}\right) \quad (10)$$

In discontinuous mode, the average output current supplied to the load is $$I_{out} = \frac{I_{max}}{2} D_2 \quad (11)$$

Taking the ratio of equation (11) and (8), the multiplier, M, in discontinuous mode can be determined and is given by:

$$M = \frac{I_{out}}{I_{in}} = \frac{D_2}{D} = \left(1 + \frac{2I_{in}L}{D^2 V_{out} T_s}\right) \quad (12)$$

The multiplier in discontinuous mode is not completely constant and contains a small dependence on the value of the output voltage, $V_{out}$. However, it can be seen that the variation in the current multiplier is small relative to the change in $V_{out}$. For example in a circuit with typical component values, a 10% increase in forward LED voltage produced only a 4% drop in the current multiplier.

Inspection of equations (10) and (12) shows that the value of the current multiplier in discontinuous current mode can easily be controlled to be constant, by controlling $D_2$ to be constant. $D_2$ can be measured by a number of methods; for example, by determining the time taken from the start of conduction of the switch 134 to the point when diode 135 comes out of conduction. If the current multiplier is constant then the current in the load is constant and there is no need to measure the actual load current. The automatic constant current feature of the second conversion stage according to this invention is not obtained by a buck converter used with a constant voltage at its input terminals. Connecting the second conversion stage to a constant current circuit such as a resonant circuit has resulted in unique circuit properties, ideal for driving LEDs over a wide range of operating conditions.

If the resonant circuit of FIG. 5 is used as the first conversion stage, for optimum operation of the circuit the value of the input inductor 131 to the second conversion stage should be similar in value to the inductor 125 of the first conversion stage. If this is done, the circuit will deliver the constant current characteristic and be in resonance over all load conditions. If the input inductor to the second conversion stage is not the same as the inductor 125, the constant current characteristic is not altered but the circuit may not maintain the resonant frequency throughout the whole load range which may reduce its efficiency.

An optional capacitor 137 is shown in FIG. 6 which can be used to smooth the output voltage applied to the load. This may be useful, particularly when the inductor current is discontinuous but it is not required to implement the constant current according to the invention.

Figure 7:
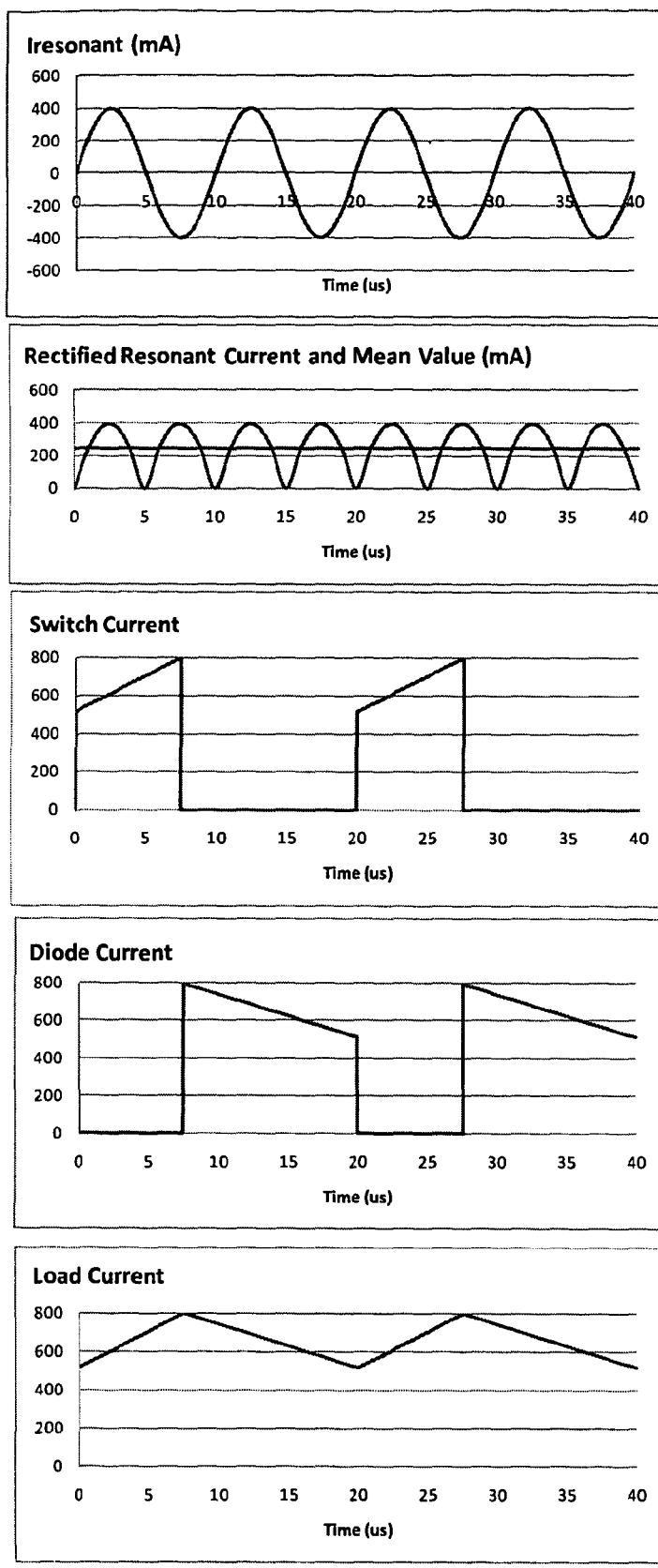
FIG. 7 and FIG. 8 show current waveforms associated with the second conversion stage operating with continuous inductor current and with two different current multiplier factors.
Figure 8:
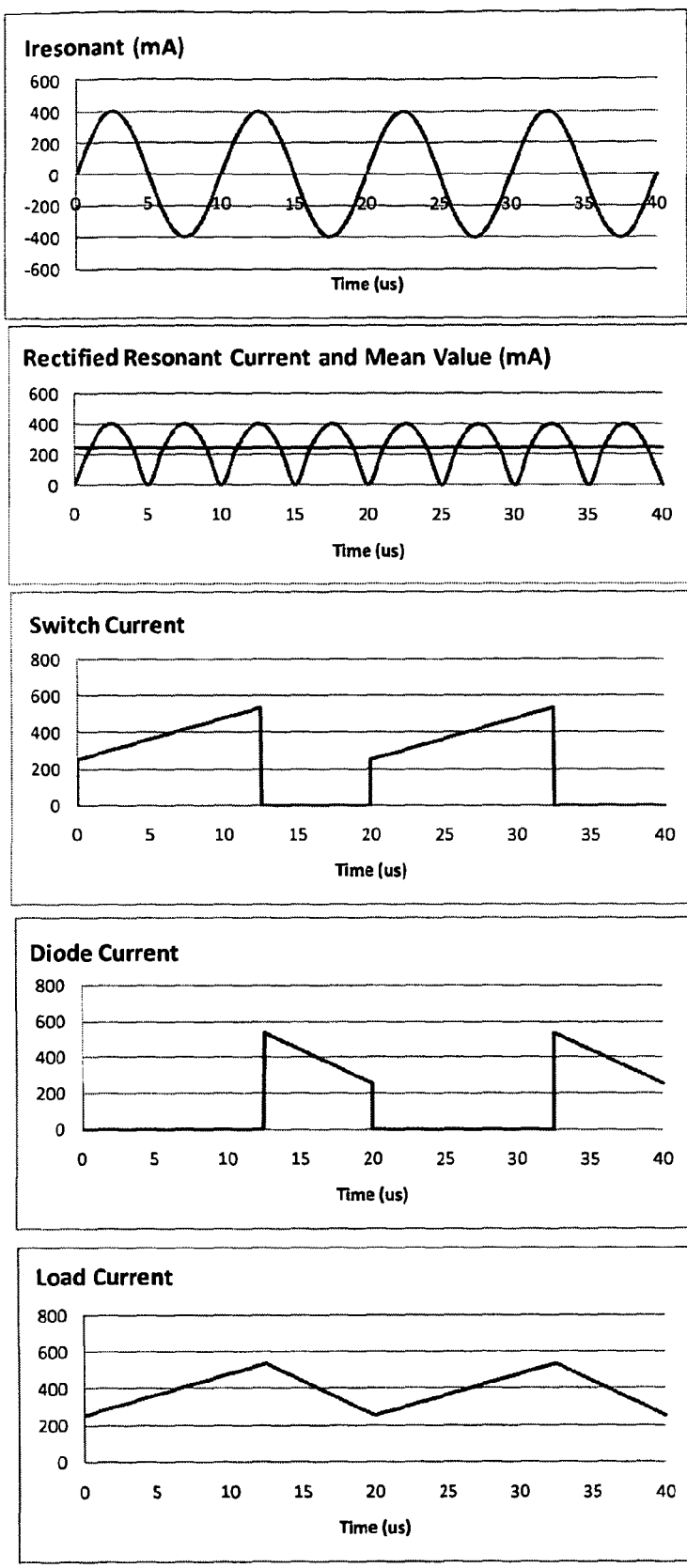
Figure 9:
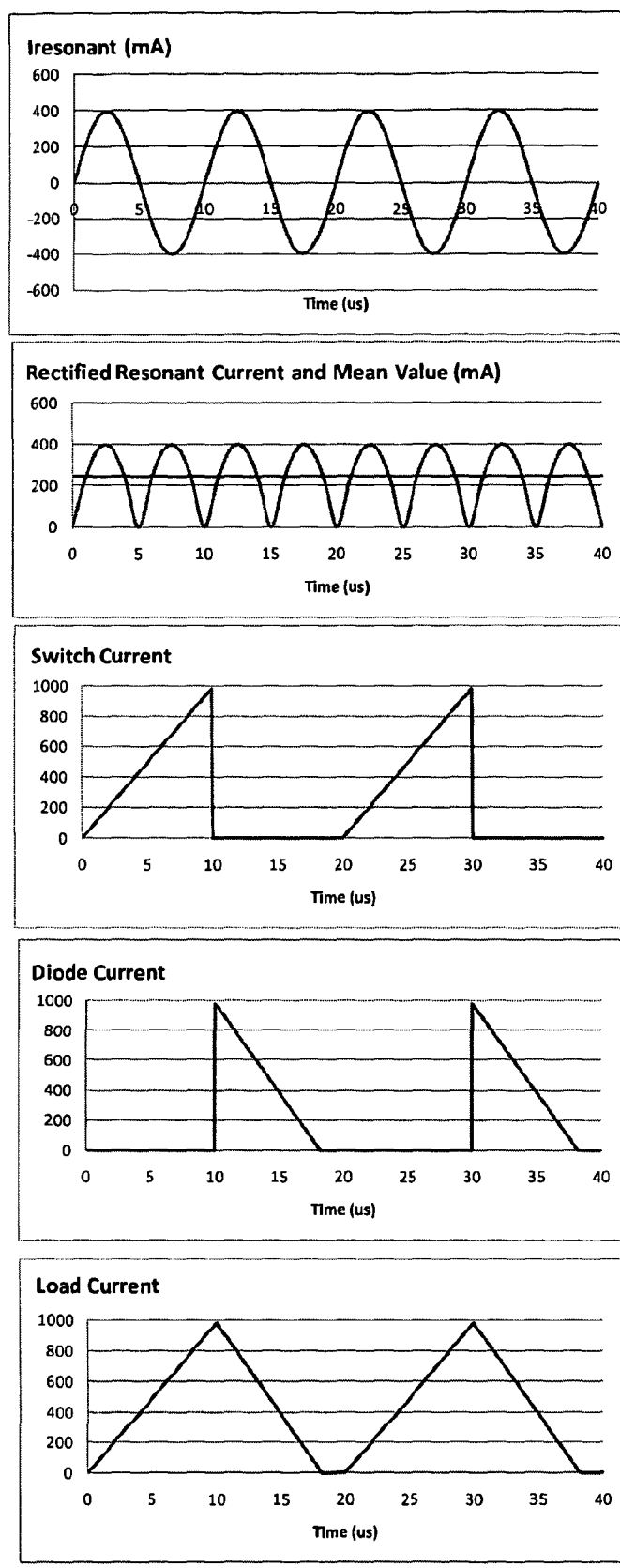
FIG. 9 shows current waveforms associated with the second conversion stage operating with discontinuous inductor current.

The operation of the second conversion stage will be illustrated further using the current waveforms in FIGS. 7, 8 and 9.

In the plots of FIGS. 7, 8 and 9 the first conversion stage has characteristics shown in Table 1.

TABLE 1

| | |
|---|---|
| Resonant Frequency | 100 kHz |
| Resonant Period | 10 us |
| Iconstant (peak) | 400 mA |

The first plot in FIGS. 7, 8 and 9 show the current delivered to the input inductor of the second conversion stage and the second plot shows the rectified current and mean value of rectified current delivered to the capacitor 133.

FIG. 7 shows operation with continuous inductor current and a duty ratio of 0.375 and the main calculated values are shown in Table 2. The current multiplier ratio calculated by equation (7) is 2.667 giving a mean load current of 657 mA. FIG. 7 also shows the switch current in the switching transistor 134 and the diode current in diode 135 which flows when the switching transistor is turned off.

TABLE 2

| | |
|---|---|
| Ton | 7.5 us |
| Period | 20 us |
| D | 0.375 |
| Multiplier | 2.667 |
| Inductance 131 | 200 µH |
| Vout | 12 V |
| Mean load current | 656.6 mA |
| ripple peak to peak | 281.3 mA |
| Imin | 515.9 mA |
| Imax | 797.2 mA |

FIG. 8 shows operation with continuous inductor current and a duty ratio of 0.625 and the main calculated values are shown in Table 3. The current multiplier ratio calculated by equation (7) is now 1.6 giving a mean load current of 394 mA.

TABLE 3

| | |
|---|---|
| Ton | 12.5 us |
| Period | 20 us |
| D | 0.625 |
| Multiplier | 1.600 |
| L | 200 µH |
| Vout | 12 V |
| Mean load current | 393.9 mA |
| ripple peak to peak | 281.3 mA |

TABLE 3-continued

| | |
|---|---|
| Imin | 253.3 mA |
| Imax | 534.6 mA |

The change in duty ratio of the switching transistor 134 between FIG. 7 and FIG. 8 has altered the current multiplier of the second conversion stage and has delivered a lower constant current to the load. The constant current provided by the first conversion stage has not been altered by the change in multiplier. Under all conditions the energy delivered from the first conversion stage must be balanced by the energy delivered by the second conversion stage to the load. This energy balance is maintained by the voltage on the capacitor 133. When the current multiplier is increased the voltage on capacitor 133 will increase automatically to draw more power from the first conversion stage. It is in this way that the first and second conversion stages work together to deliver controlled current to the load, even if the load voltage changes.

FIG. 9 illustrates the current waveforms in discontinuous mode. Table 4 illustrates the calculated values. The discontinuous mode has occurred because the value of inductance 136 has been reduced from 200 µH to 100 µH. It can be noted from Table 4 that a duty ratio of 0.5 was used. In continuous mode this would have produced a multiplier of 2.0. In discontinuous mode the multiplier is given by equation (12) and is slightly lower at 1.821.

Whilst the peak to peak current ripple is higher, the example in FIG. 9 uses a smaller output inductor which reduces the cost of the circuit but does introduce some load dependence into the current multiplier value.

TABLE 4

| | |
|---|---|
| Ton | 10 us |
| Period | 20 us |
| D | 0.5 |
| Multiplier | 1.821 |
| D2 | 0.910 |
| L | 100 uH |
| Vout | 12 V |
| Mean load current | 448.3 mA |
| ripple peak to peak | 984.9 mA |
| Imin | 0 mA |
| Imax | 984.9 mA |

As shown by FIG. 4 the invention can be extended so that there can be more than one second conversion stage operating from a single first conversion stage. The second conversion stage circuit of FIG. 6 can be repeated with the input terminals 110 of each repetition connected in parallel. The constant current output of the first conversion stage is divided between each of the second conversion stages. When used with the resonant circuit in FIG. 5, and if the input inductors 131 of each of the second conversions stages are all identical the constant current output of the first conversion stage will be divided equally between each of the second conversion stages. If all the second conversion stages operate with the same duty ratio the output currents delivered to loads connected to their respective output terminals 112 will all be very similar (small variations will be expected due to tolerance of inductor values).

Alternatively the input inductors of each second conversion stage can be selected to provide an unequal split in the current flowing into each second conversion stage. The current split between the stages follow the same rules as parallel resistances. The second conversion stage with the highest input inductance will receive the lowest fraction of the total constant current delivered by the first conversion stage and the second conversion stage with the lowest input inductance will receive the highest fraction of the total constant current delivered by the first conversion stage.

In applications with more than one second conversion stage the duty ratio of the switching transistor in each of the second conversion stages provides different current multiplier factors, and can deliver different currents to the loads connected to the respective output terminals of each of the second conversion stages.

Using this feature of the invention it is easy to drive multiple LED strings with independently variable currents. This is particularly useful to drive coloured LEDs with variable intensity to achieve different colour blends. For example a power supply according to the invention could have one first conversion stage and three second conversions stages driving strings of red, green and blue LEDs respectively. By adjusting the duty ratio of the three switching transistors in the three second conversion stages, a complete colour blending spectrum can be obtained. At all times the current in the LEDs will be limited to a value set by the constant current supplied from the first conversion stage, factored by the current split ratio between the parallel input terminals to the second conversion stages and multiplied by the individually controlled multiplier ratio of the switching transistor of the respective second conversion stage. Any lighting effect can be obtained by using the multiple outputs of a power supply according to the invention to drive LEDs of different colours, different structures or different intensities.

Figure 10:
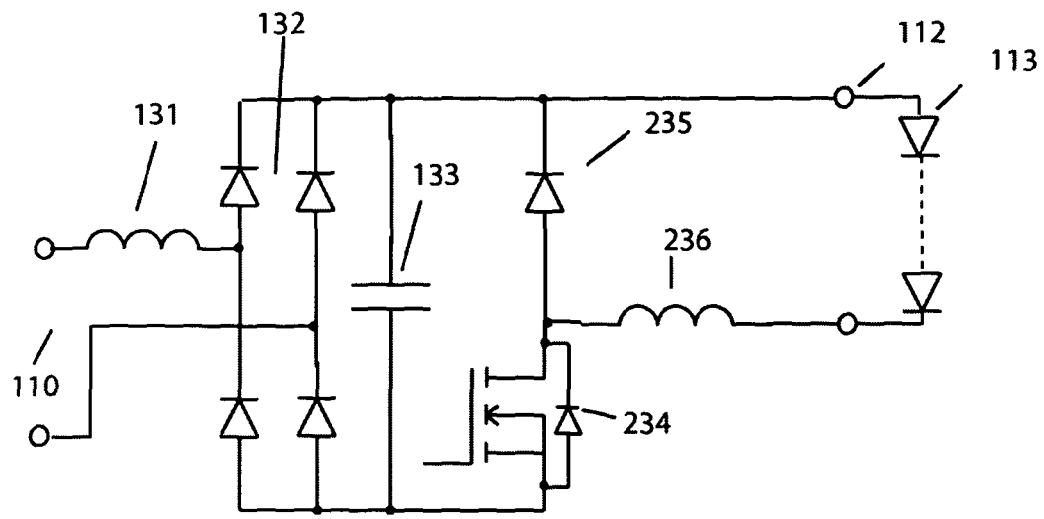
FIGS. 10, 11 and 12 show further examples of second conversion stages according to the invention.

FIG. 10 illustrates an alternative configuration for the buck converter which can be used in the second conversion stage. The input terminals, inductor 131, rectifier 132 and capacitor 133 are arranged in the same way as FIG. 6. The positions of the switching transistor 234 and diode 235 are reversed. As a result the inductor 236 now becomes a constant current sink rather than a constant current source. The load 113 is connected as before to the output terminals 112.

Figure 11:
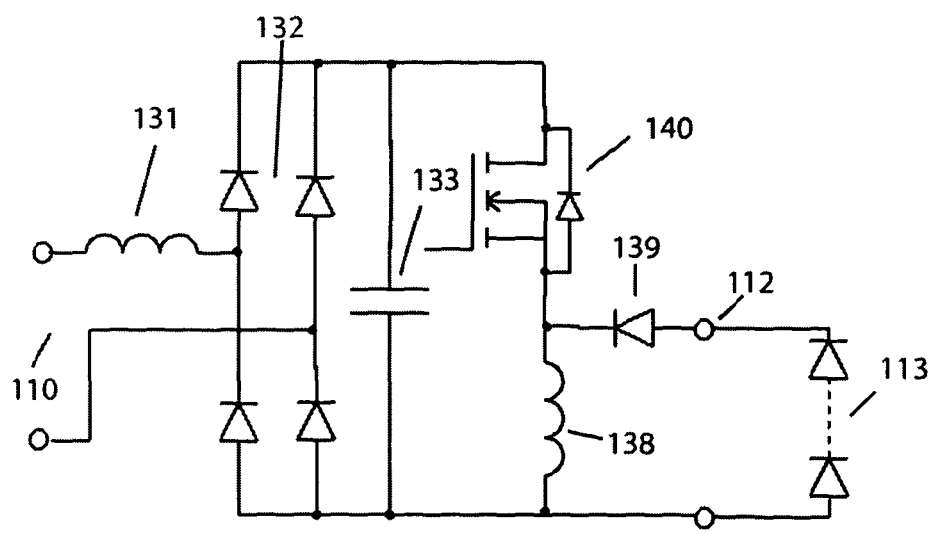

FIG. 11 illustrates a buck-boost circuit configuration which can also be adapted for use in the second conversion stage. The position of the diode 139 and inductor 138 have been interchanged and the load current now returns to the anode of diode 139.

A second conversion stage based on FIG. 6 or FIG. 10 can provide current multipliers of one or more. A second conversion stage based on FIG. 11 can provide current multipliers of more than or less than unity. In continuous inductor current mode the current multiplier, M, in the second conversion stage of FIG. 11 is given by:

$$M = \frac{1-D}{D} \qquad (13)$$

where D is the duty ratio of switching transistor 140.

Figure 12:
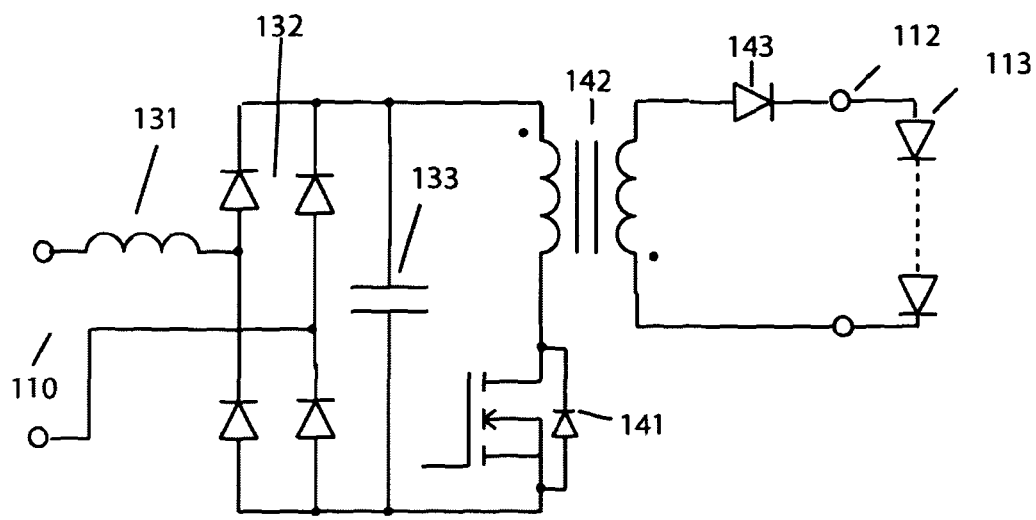

FIG. 12 shows a possible implementation of the second conversion stage based on the flyback converter. In this circuit the inductor 138 of FIG. 11 is replaced by a coupled inductor 142, providing electrical isolation to the output terminals. The multiplier given by equation (13) is further modified by the turns ratio of the coupled inductor. This is useful if a larger multiplier is required without using a low value of D. This circuit offers a major advantage over the flyback converters used in the prior art to drive LEDs. Since the output current is automatically controlled by the first conversion stage and the current multiplier there is no need to add measurement of current to the isolated load. This is difficult to achieve while maintaining full isolation.

Other circuits used as dc to dc converters in the prior art are suitable for use as second conversion stages. For example the forward converter is an isolated version of the buck converter and can be used as a current multiplier according to the invention.

Figure 13:
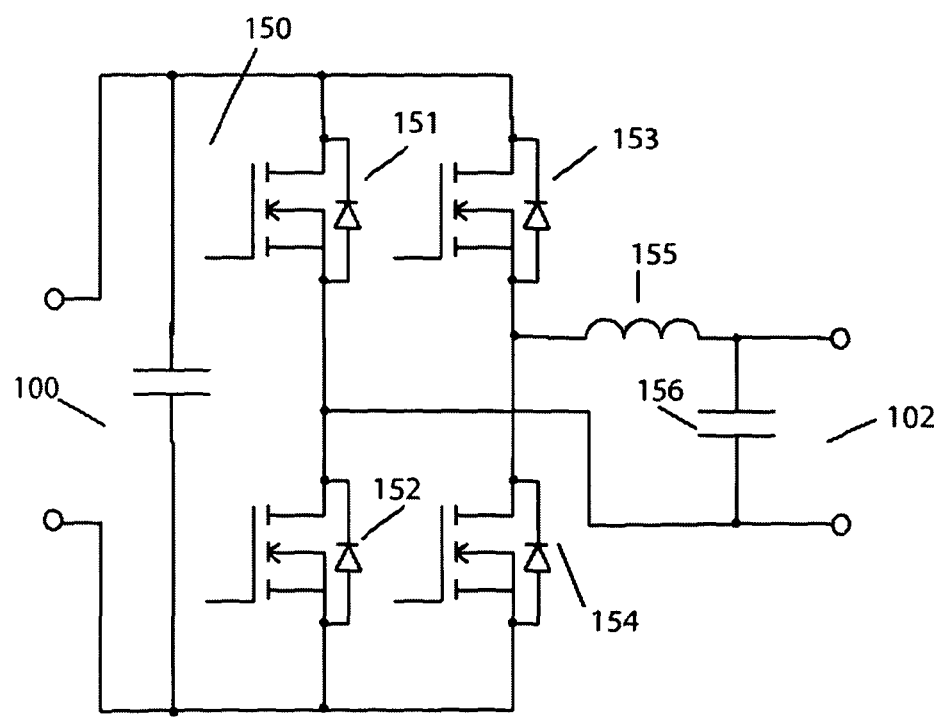
FIG. 13 shows a further example of a first conversion stage according to the invention.

FIG. 13 illustrates another embodiment of the first conversion stage utilising a full bridge resonant inverter with four switching transistors 151, 152, 153 and 154. A single capacitor 150 is connected across the input terminals 100. The resonant network comprising inductor 155 and capacitor 156 are connected between the mid-point of transistors 151 and 152 and the mid-point of transistors 153 and 154. The constant current output to one or more second conversion stages is taken through output terminals 102, in parallel with capacitor 156.

Figure 14:
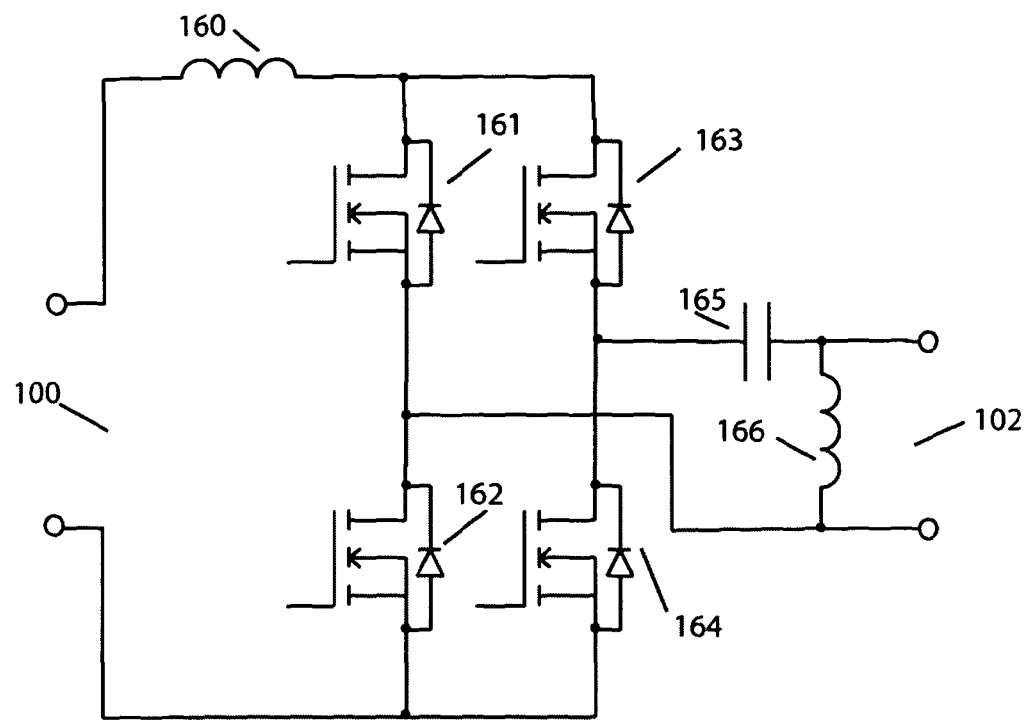
FIG. 14 shows a further example of a first conversion stage according to the invention and FIG. 15 shows an example of a second conversion stage according to the invention which would be used in conjunction with the first conversion stage in FIG. 14.

FIG. 14 illustrates a further embodiment for the first conversion stage. This also utilises a full bridge resonant inverter with four switching transistors 161, 162, 163 and 164. The input terminals are connected to an inductor 160, rather than a capacitor. This inverter operates as a current source inverter and inductor 160 acts to create the effect of a current source from a supply system. If the supply system for the circuit is an ac supply there will be an additional rectifier between the ac supply and the input terminals 100. In the current source resonant converter the positions of the resonant capacitor 165 and resonant inductor 166 have been interchanged such that the constant current supply to the second conversion stage is supplied in parallel with inductor 166. The choice of operating frequency to achieve the constant current characteristic follows the same rule as already described. Operation of the circuit at a frequency where the reactance of capacitor 165 is equal in magnitude to the reactance of inductance 166 will deliver constant current at the output terminals. FIG. 14 offers an advantage when operated on an ac (triac) dimming circuit through an input rectifier. When the triac is first switched on the inductor 160 controls the rate of rise of current through the triac.

Figure 15:
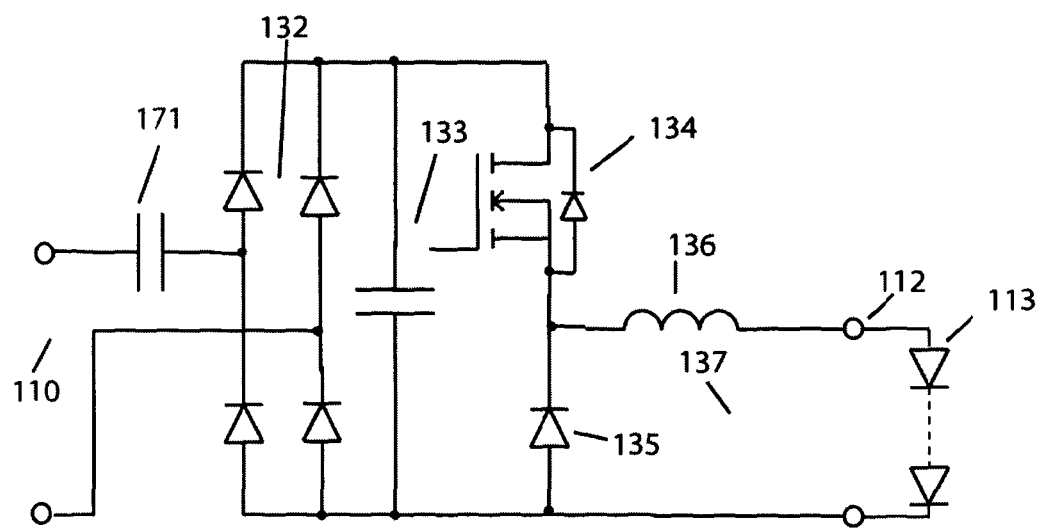

FIG. 15 illustrates a modified second conversion stage for use with the circuit of FIG. 14. Each second conversion stage now has an input capacitor 171 rather than an input inductor. Second conversion stages of this type can be connected in parallel to a single first conversion stage illustrated in FIG. 14. Since reactance of capacitors varies inversely with the capacitance, the current sharing between parallel connected second conversion stages is in relation to the value of capacitance 171 at the input to each stage. The second conversion stage with the highest input capacitance will take the largest fraction of the constant current supplied by the first conversion stage of FIG. 14. If operation of FIG. 14 at constant resonant frequency is required in addition to constant output current, it is best to choose the values of input capacitors such that the sum of all the individual input capacitors 171 is similar to the capacitance of 165. Design of a power supply according to FIGS. 14 and 15 may be more efficient as the number of high frequency inductors required is reduced. Typically a high frequency inductor has higher losses than a capacitance of equivalent reactance.

Figure 16:
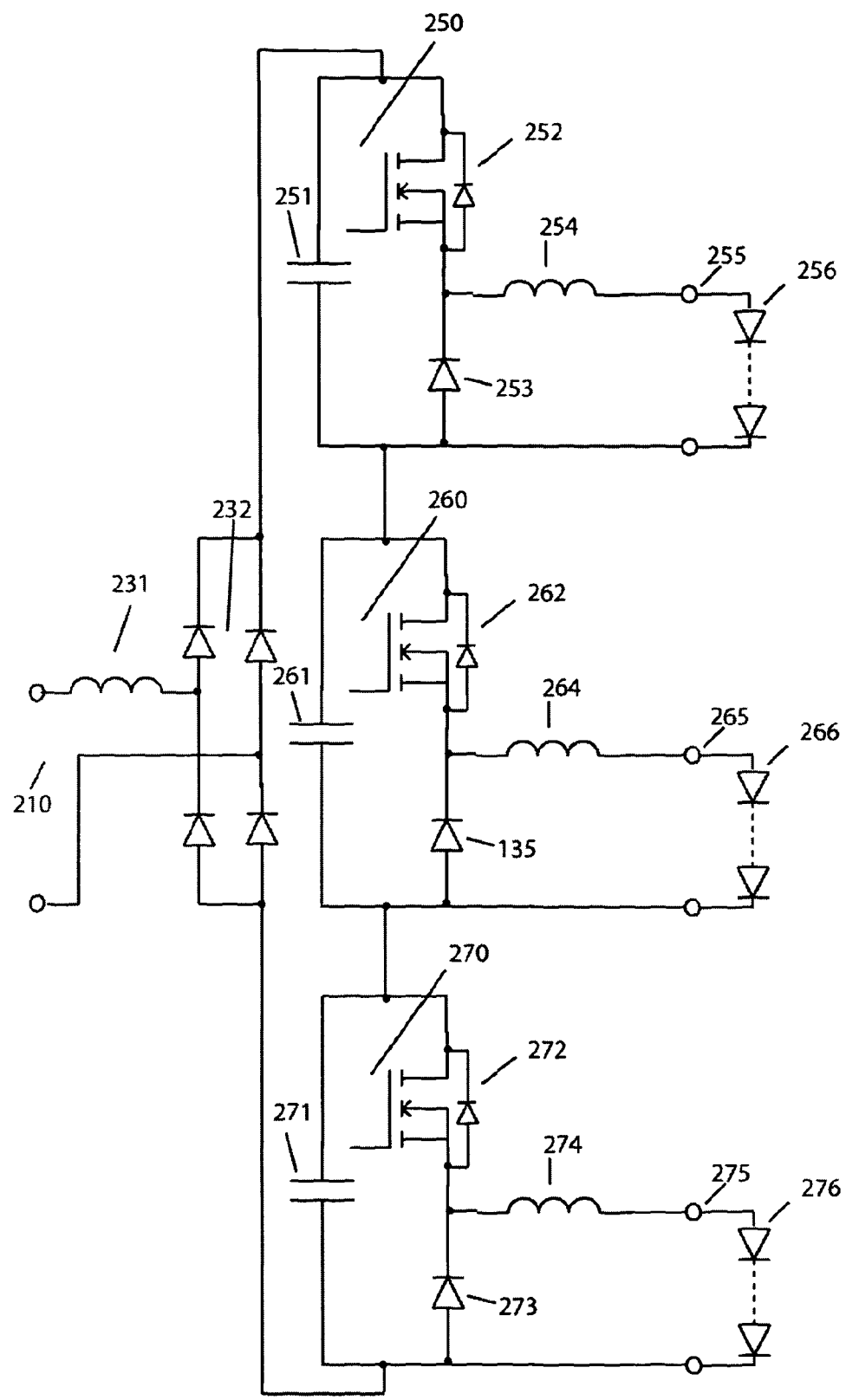
FIG. 16 shows an example of three second conversion stages with common input inductor and rectifier.

As an alternative to the parallel connection of second conversion stages illustrated by FIG. 4, it is possible to connect second conversion stages in series. Such an implementation is illustrated by FIG. 16. The circuit has a single pair of input terminals 210 to receive constant input current from a first conversion stage. A single input inductor 231 and a single bridge rectifier 232 are required. Three second conversion stages 250, 260 and 270 are shown connected in series across the output of rectifier 232. Any possible number could be used. Each second conversion stage has capacitor 251, 261 or 271 and respective switching transistor 252, diode 253, inductor 254 and output terminals 255 to connect to load 256.

Each series connected second conversion stage can operate at the same or different duty ratio to deliver the same or individually controlled constant currents to each load 256, 266 or 276. The voltages across the capacitors 251, 261 and 271 will automatically adjust to deliver the correct power to each load with the capacitor of the second conversion stage with the highest output current automatically having the highest voltage. In this way the power delivered from the first conversion stage is shared between the multiple outputs.

The rectifier 232 is used to convert the high frequency ac of a first conversion stage such as FIG. 5 to the dc controlled or pre-determined current delivered to the series connected second conversion stages. If another form of power supply is used which is capable of delivering the controlled or pre-determined constant current as a dc current through the inductor 231 then the rectifier 232 would not be necessary.

In a further aspect of the invention the inductor 231 may be the output inductor of a controlled current buck converter. A buck converter known from the prior art may therefore be used as the first conversion stage inconjunction with one or more second conversion stages, the second conversion stages providing independent current multiplication factors of the controlled current created by the buck converter of the first conversion stage. Implementation of the invention in this way provides an additional control function since the output current of the first conversion stage is now controllable and therefore the input current to the current multipliers of the second conversion stages can all be changed with one control parameter. This can be useful where the overall light level needs to be dimmed while still retaining the independent setting of currents in individual LED strings attached to each second conversion stage. The use of a controlled current buck converter as the first conversion stage does require a method of current feedback such as a sense resistor. However, only one current feedback sensor is required for the whole circuit since the current multipliers of the second conversion stages allow independent control of multiple LED loads from the single current source.

Operation of all the circuits according to the invention can be achieved at very high efficiency since the first conversion stage only ever delivers the power required by the load. Also by using two conversion stages the efficiency of each circuit and component choices can be optimised.

The diagrams used to illustrate this invention have all shown power mosfets as the switching transistors. The invention can be implemented using any type of switching transistor.

Power supplies according to the invention can be further adapted by replacing the input inductors of the second conversion stage with a high frequency transformer. The constant current primary current will deliver constant current to each secondary windings. The turns ratio between the first and second conversion stages can be used to create additional current ratios.

All circuits according to the invention can be used with a triac ac dimming circuit. The triac is connected via an additional rectifier to the input terminals of the first conversion stage. As the firing delay angle of the triac is increased the voltage applied to the input terminals of the first conversion stage is reduced. When using a resonant circuit as the first conversion stage, the value of the constant current delivered by the first conversion stage will reduce in proportion to the reduced input voltage and the current delivered by each second conversion stage will reduce by the same factor. Independent control of the individual output currents from a multiple output power supply under triac input dimming is also possible by variation of the current multipliers. In this way it is possible to provide different rates of dimming on different loads.

Circuits according to this invention are particularly suited to LED back lighting applications in LCD display panels and televisions. In such applications high numbers of LEDs are used and there is a requirement to vary the colour of the light output, dependent on ambient light levels. A circuit according to this invention would have a first conversion stage delivering a controllable or pre-determined constant current to one or more second conversion stages, each second conversion stage independently setting the current multiplication factor for the LEDs connected to the output terminals of each second conversion stage.

In some large display panels used for low cost, low resolution display, the pixels are individual LEDs of different colours. Independent control of each colour pixel is required to create the display pictures. Driving such display panels with circuits according to this invention can dramatically reduce the complexity and cost of the circuit required.

The invention claimed is:

1. A power supply circuit comprising at least two conversion stages, a first conversion stage comprising:
    input terminals for connection to an ac or dc supply;
    an electronic converter with controlled or pre-determined output current characteristics; and
    output terminals for connection to at least one second conversion stage,
    each second conversion stage comprising:
    input terminals to receive a substantially constant current input from a first conversion stage;
    a current multiplier circuit; and
    output terminals for connection to a load;
    wherein the electronic converter of the first conversion stage is a high frequency resonant converter comprising a series parallel resonant converter, with an inductance connected in series with a capacitor, and the output terminals for connection to the at least one second conversion stage are connected across the capacitor or the inductance.

2. A power supply circuit according to claim 1 wherein the load connected to each second conversion stage comprises one or more LEDs connected in series.

3. A power supply circuit according to claim 1 wherein the current flowing out of the output terminals of the first conversion stage is substantially constant irrespective of variations in the number and forward voltage characteristics of one or more LEDs connected to the output terminals of each second conversion stage.

4. A power supply circuit according to claim 1 wherein the electronic converter of the first conversion stage comprises a dc to dc converter with controllable output current characteristics.

5. A power supply circuit according to claim 1 in which the first conversion stage is directly connected to one second conversion stage.

6. A power supply circuit according to claim 1 in which the first conversion stage is connected to two or more second conversion stages.

7. A power supply circuit according to claim 6 in which two or more second conversion stages are connected in parallel.

8. A power supply circuit according to claim 7 in which two or more second conversion stages are connected in series.

9. A power supply circuit according to claim 1 in which the first conversion stage is connected to three second conversion stages, the three second conversion stages connected to different coloured LEDs respectively.

10. A power supply circuit according to claim 1 in which the first conversion stage is connected to more than one second conversion stage, each second conversion stage operable with variable current multiplier ratios such that a set of LEDs connected to each second conversion stage can be operated with substantially different currents without alteration of the constant, controllable or pre-determined current supplied by the first conversion stage.

11. A power supply circuit according to claim 9 in which independently variable current multipliers of the three second conversion stages are used to vary the intensity of different coloured light from the LEDs to provide colour mixing.

12. A power supply circuit according to claim 1 in which a sum of the output currents of the at least one second conversion stage is higher than the output current of the first conversion stage.

13. A power supply circuit according to claim 1 in which the current multiplier circuit of the at least one second conversion stage comprises one of a buck converter, a buck-boost converter, an isolated flyback converter and an isolated forward converter.

14. A power supply circuit according to claim 1 in which the high frequency resonant converter comprises a series parallel resonant converter, operating substantially at one of its resonant frequencies.

15. A power supply circuit comprising at least two conversion stages,
    a first conversion stage comprising:
    input terminals for connection to an ac or dc supply;
    an electronic converter with controlled or pre-determined output current characteristics; and
    output terminals for connection to at least one second conversion stage,
    each second conversion stage comprising
    input terminals to receive a substantially constant current input from a first conversion stage;
    a current multiplier circuit; and
    output terminals for connection to a load;
    wherein the electronic converter of the first conversion stage is a high frequency resonant converter comprising a series parallel resonant converter, with an inductance connected in series with a capacitor, and wherein the at least one second conversion stage forms a parallel path around the capacitor of the series-parallel resonant converter, each parallel path containing a further inductance.

16. A power supply circuit comprising at least two conversion stages,
    a first conversion stage comprising:
    input terminals for connection to an ac or dc supply;
    an electronic converter with controlled or pre-determined output current characteristics; and
    output terminals for connection to at least one second conversion stage,
    each second conversion stage comprising:
    input terminals to receive a substantially constant current input from a first conversion stage,
    a current multiplier circuit; and
    output terminals for connection to a load;
    wherein the electronic converter of the first conversion stage is a high frequency resonant converter comprising a series parallel resonant converter, with a capacitor connected in series with an inductance, and wherein each second conversion stage forms a parallel path around the inductance of the series parallel resonant converter, each parallel path containing a further capacitor.

17. A power supply circuit according to claim 1 wherein the input terminals of the first conversion stage are connected to a phase angle controlled ac supply such that variation of the phase angle causes at least one set of LEDs connected to the output terminals of the second conversion stages to vary in brightness.

* * * * *